June 27, 1950 K. TOMLINSON 2,512,843
MEANS FOR PLUCKING FEATHERS
Filed Dec. 29, 1944 3 Sheets-Sheet 1
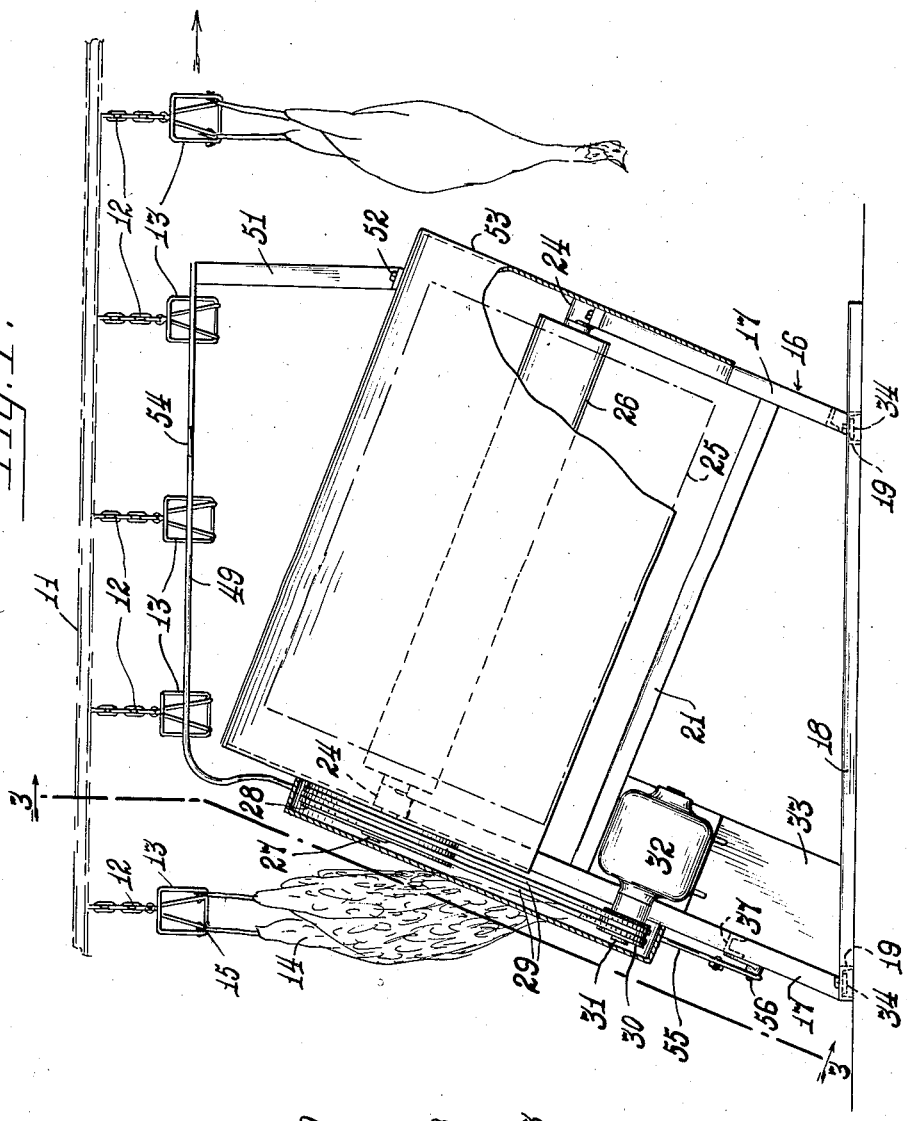
INVENTOR.
Kent Tomlinson
BY
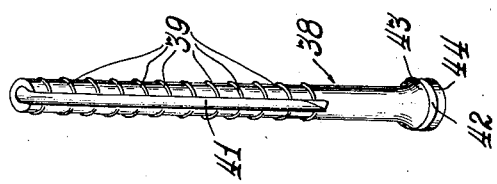
ATTORNEY

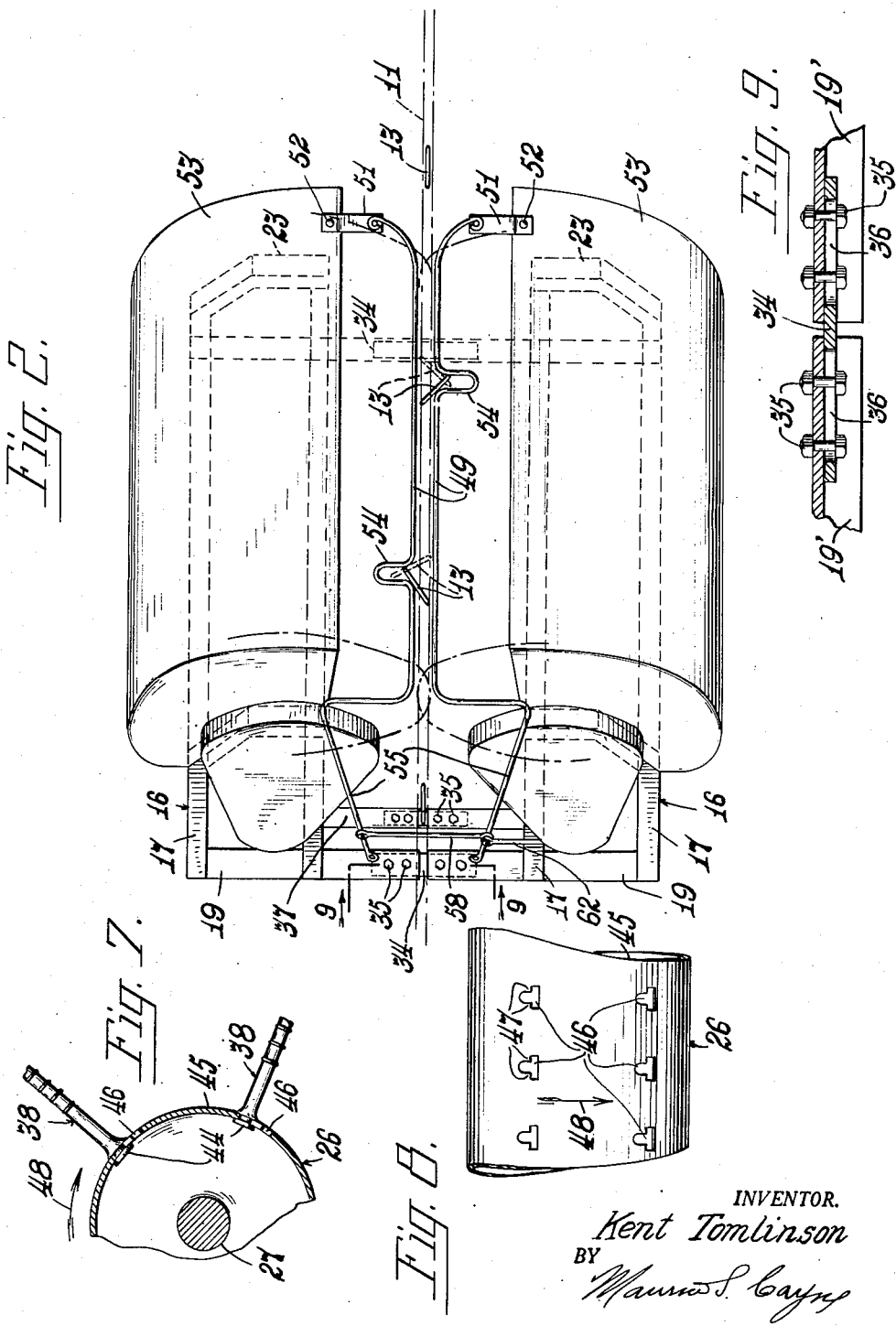

June 27, 1950 K. TOMLINSON 2,512,843
MEANS FOR PLUCKING FEATHERS
Filed Dec. 29, 1944 3 Sheets-Sheet 3
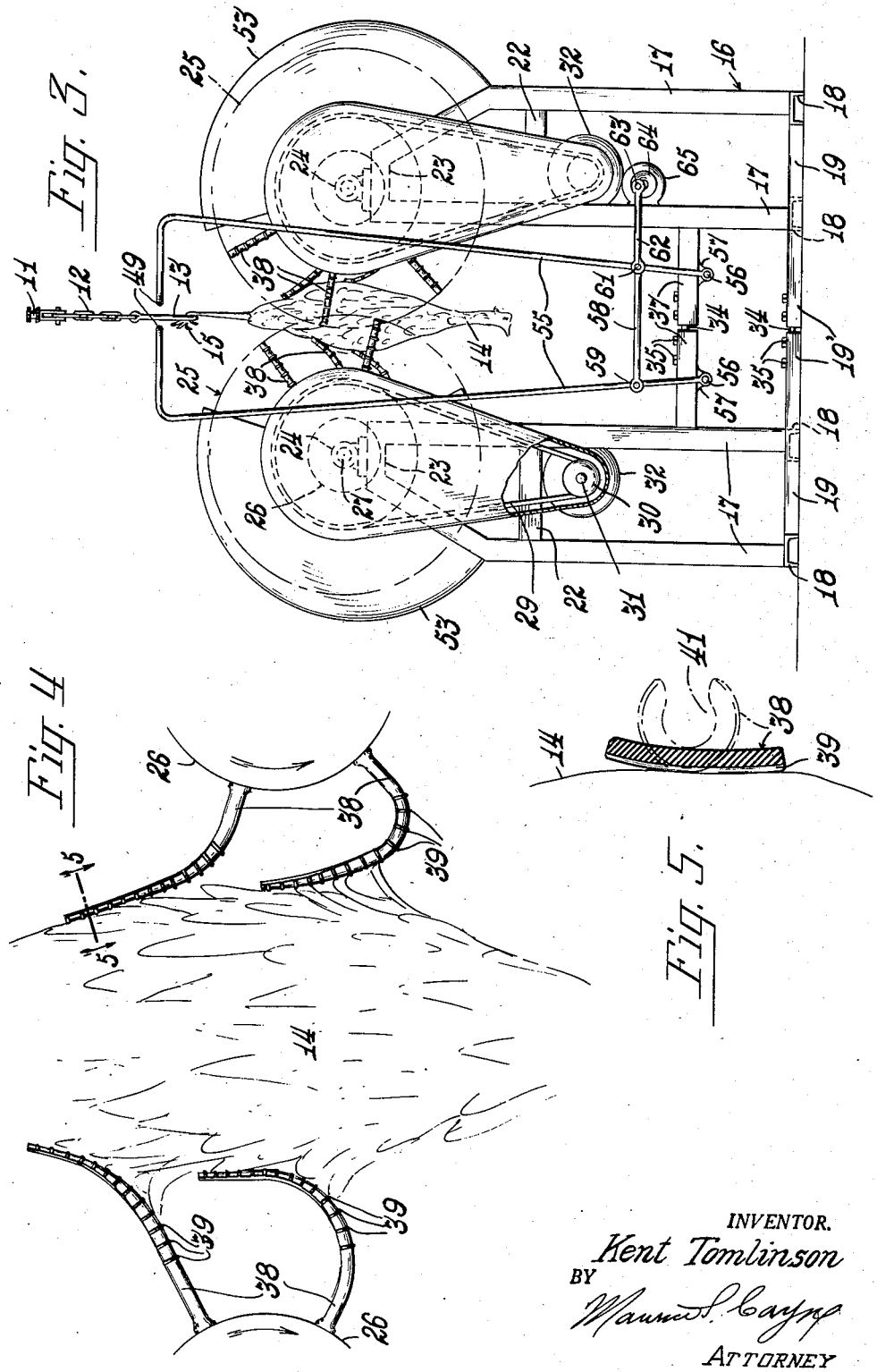
INVENTOR.
Kent Tomlinson
BY
ATTORNEY Patented June 27, 1950

2,512,843

UNITED STATES PATENT OFFICE 2,512,843

MEANS FOR PLUCKING FEATHERS

Kent Tomlinson, Chicago, Ill., assignor, by mesne assignments, to Edward J. Albright, Chicago, Ill.

Application December 29, 1944, Serial No. 570,382

10 Claims. (Cl. 17—11.1)

The invention relates to plucking machines and more particularly to a method and improvements in an apparatus for plucking feathers from fowls.

Mechanical removal of feathers from fowls has many advantages over the former practice of hand picking, particularly in packing establishments handling a large volume of dressed poultry. The usual practice in the dressing of poultry involves the scalding of the fowl preliminary to removal of the feathers. Various machines and apparatus have been employed with varying degrees of success to remove the feathers after the fowl has been scalded. However, some of these known prior machines are entirely automatic but are objectionable in use because they require careful attention by the operator to insure proper and complete removal of all feathers without damage to the fowl. Other known types of machines require the individual application and manual positioning of the fowl during the defeathering operation. Such machines as are entirely or substantially automatic in operation also are objectionable in use because of the impossibility of adapting them to accommodate fowls of various kinds and sizes. It is, therefore, an object of the present invention to provide an apparatus for plucking feathers from fowls which is entirely automatic in operation and which may be adjusted to accommodate fowls of different kinds and sizes so as to insure complete removal of all of the feathers therefrom.

Machines of the type commonly employed to remove feathers from fowls operate upon the principle of striking the fowl and rubbing the feathers therefrom, and frequently the means employed for accomplishing these operations are impractically designed or are otherwise constructed so as not to operate with the utmost efficiency that might be expected of such means. It is therefore, another object of the present invention to provide an apparatus for removing feathers from a fowl with novelly constructed elements of a kind which will strike and rub the fowl with the requisite degree of firmness without endangering the fowl to damage resulting from bruises, abrasion, or the like.

Known types of machines, other than those requiring manual positioning of the fowl during the defeathering operation, frequently fail to effect complete removal of all of the feathers because they lack means to vary the position of the fowl while it is passing through the apparatus with the result that certain areas thereof are not fully exposed to the striking and rubbing action of the feather removing elements. It is, therefore, another object of the present invention to provide means whereby the fowl, while passing through the apparatus, is automatically and positively rotated independently of the action of the striking and rubbing elements so as to expose all areas thereof to said elements.

Another object of the invention is to provide an apparatus of the character described with novelly constructed means to insure adequate vibration of the fowl while it is passing through the machine so as to thereby increase the effectiveness of the plucking elements.

Another object of the present invention is to provide a feather plucking apparatus with flexible plucking fingers mounted upon a rotatable drum or the like in such manner as to be easily and quickly attached to or separated from said rotatable drum.

Another object is to provide flexible plucking fingers in an apparatus of the kind described with novel structural features adapting said fingers to more readily serve the purpose for which they are provided.

Another object of the present invention is to provide a novel method for plucking feathers from fowls.

Other and further objects of the present invention will be apparent from the following description and claims and are illustrated in the accompanying drawings which, by way of illustration, show a preferred embodiment and the principle thereof and which is considered to be the best mode contemplated for applying that principle. Other embodiments of the invention embodying the same or equivalent principle may be used and structural changes may be made as desired by those skilled in the art without departing from the present invention and the purview of the appended claims.

In the drawings:

Fig. 1 is a side elevational view of the plucking apparatus embodying features of the present invention.

Fig. 2 is a plan view of the apparatus.

Fig. 3 is an end elevational view as viewed substantially along line 3—3 of Fig. 1.

Fig. 4 is a fragmentary detail view on an enlarged scale illustrating the operation of the plucking fingers.

Fig. 5 is an enlarged sectional detail view of a plucking finger, taken on line 5—5 of Fig. 4.

Fig. 6 is a perspective view of one of the plucking fingers.

Fig. 7 is a fragmentary transverse sectional view through one of the rotors.

Fig. 8 is a fragmentary plan view of the rotor drum.

Fig. 9 is a sectional detail view taken on line 9—9 of Fig. 2.

The feather plucking apparatus illustrated in the accompanying drawings is intended to have the fowl carried thereto and therethrough continuously by means of an elevated conveyer chain 11, best illustrated in Fig. 1, of a kind adapted to advance the fowl directly to said machine from a scalding tank, not shown.

The chain 11 is provided with a plurality of depending link elements 12, suitably spaced apart longitudinally thereof as shown, each of which carries on its lower end, a suitable frame or carrier 13 of any conventional construction providing means for quickly and easily attaching or removing a fowl for suspension therefrom. As shown, the fowl indicated at 14 is suspended from the carriers 13 by having their feet 15 wedgingly clamped therein.

The apparatus for removing the feathers from the scalded fowls as they are advanced by the carrier chain 11, generally consists of a pair of frame members 16. These frame members 16 are alike and each is in the form of a skeleton-like structure consisting of a built-up organization of channel and angle bars. More specifically, angle bars 17 are provided at each corner and they extend upwardly and preferably are inclined in a common direction as best shown in Fig. 1. The bottom ends of the angle bars 17 are firmly secured as by welding to longitudinal base channels 18 and transverse end channels 19. Suitable connecting bars 21 extend longitudinally between related angle bars 17 above the base channels 18 and transverse connecting bars 22 and are arranged above the base channels 19 to provide a rigid frame construction. Each frame 16 is provided at its upper end with end head rails 23 at each end. These head rails provide means for mounting suitable bearings 24, which are in axial alignment and which provide a mounting for a rotor 25 including a rotatable drum 26 having its shaft 27 extended through and journalled in the bearings 24. Each shaft 27 has one end extending beyond the related bearing 24 and is provided on its extended end with a pulley 28 connected, by means of belts 29 to a pulley 30 mounted upon a shaft 31 of a motor 32. Each motor 32 is suitably mounted for adjustment upon a plate 33 firmly secured as by welding to the frame member 16 below the longitudinal tie-bar 21. This construction provides means whereby each rotor 25 may be rotated upon operation of its related motor 32.

The two frames 16 with their rotors 25 are adapted to be positioned side by side and are suitably spaced apart a sufficient distance to enable a fowl 14 to advance therebetween during operation of the conveyer 11. To this end, and to firmly secure said frames in such position, the bottom end channels 19 of each frame are extended beyond one side of each frame so as to provide opposed portions 19' in alignment with each other. These portions 19' are connected, as best shown in Fig. 9, by means of a connecting bar 34 located within and bridging the gap between the channels 19'. Bolts 35 firmly connect the bar 34 with each of respective channels 19', said bolts 35 extending through holes in the channels 19' and through elongated slots 36 in said bar for a purpose to be discussed presently.

Added rigidity is afforded to the connected frames 16 by providing additional transverse connecting channels or angles 37 on each frame 16 above the end channel extensions 19', which bars are connected by tie-bars 34 in the same manner as has been previously described in connection with the securement of the channel bars 19', and like numbers are used to designate the corresponding elements.

Each of the rotors 25 is provided with novel means to effectively engage the fowl as it passes through the apparatus so as to remove the feathers therefrom. To this end each rotor drum 26 carries a plurality of circumferentially spaced rows of spaced resilient fingers 38. The fingers 38 are of such length as to extend into the space between the drums 26 with the fingers of one drum slightly overlapping the fingers on the other drum when the two rotors are in operation. Normally and while the rotors are at rest, the fingers 38 will hang susbtantially limp from the drums, however, when the drums are rotated, said fingers are extended outwardly substantially radially from said drums due to the centrifugal forces of rotation. For this purpose, said fingers preferably are formed of rubber or material of like composition which iss not readily damaged by abrasion or heat.

As best shown in Fig. 6, each finger preferably is substantially round in cross-section and is provided on its outside surface throughout a greater portion of its length with spaced projections 39, preferably in the form of circumferential ribs, and one side thereof is suitably channelled or otherwise cut away, as at 41, through a greater portion of its diameter to provide, in effect, a finger substantially U-shaped in section. The end of the finger 38 to be mounted on the drum 25 is suitably enlarged and recessed circumferentially, as at 42 to provide spaced mounting flanges 43 and 44. The wall 45 of the drum 26 is provided with spaced apart rows of openings 46, each to receive one of the fingers 38. Each hole 46 preferably is in the form of a bayonet slot as shown, of sufficient size at one end as to freely admit the flange 44 on a finger 38 so as to permit the finger 38 to be slid in the direction of the smaller end of the slot to engage the side margins 47 of said slot in the recess 42 to thereby firmly retain the finger in place.

Upon reference to Figs. 7 and 8, it will be noted that the bayonet slots 46 are so positioned on the drum 26 and with relation to the direction of rotation of said drum (indicated by the arrow 48) that the fingers are necessarily moved in a direction opposite to said direction of rotation when being mounted. Accordingly, there is no possibility of the fingers 38 becoming disengaged from their related bayonet slots 46, but instead said fingers are more firmly wedged into engagement with said slots during operation of the apparatus.

Upon reference to Fig. 4, it will be noted that the fingers 38 are arranged on the drum 26 so as to locate the side thereof having the channel 41 in such position that the unchannelled or ribbed surface of the fingers will strike the fowl 14 during operation of the apparatus. This positioning of the fingers is of utmost importance since it is highly desirable to present as large an area of the ribbed face of each finger against the fowl so as to increase the effectiveness of said fingers in the feather removing operation.

As has been noted hereinabove, the drums 26 and fingers 38 constitute rotors operable in unison in such a manner as to cause the fingers of said rotors to strike against and be flexed considerably by contact with the fowl 14. This flexing of the fingers 38 is effective to cause them to flare outwardly laterally due to the provision of the groove 41 on the rear face thereof. Such flaring out of the fingers 38 is best illustrated in Fig. 5 where it will be noted that a substantially flat surface, having projections on ribs 38 thereon, is presented for rubbing engagement with the fowl. Thus it will be apparent that a maximum area of the fowl is more quickly defeathered by operation of the device herein disclosed.

The machine of the present invention is intended for use in connection with plucking of feathers from fowls of different sizes and kinds. Obviously, the spacing between the rotors 25 carried on the respective frames 16 must be varied to effect the variation in the effective projection of the fingers 38 during operation of the rotors. Such adjustment is attained through the construction previously described herein, whereby said frames are connected by the tie-bars 34 and bolts 35. It should be evident also that differences in the size and kind of fowl passed through the machine frequently makes it desirable to cause greater or less rubbing friction to be applied to such fowl during a certain portion of its passage. Accordingly the means for varying the spacing of the frames 16 may be adjusted so as to position the frames closer together at one end of said machine than at the other end of said machine.

Additional operating efficiency and effectiveness is provided in the present machine by inclining the rotors 25 downwardly in the direction of advance of the carrier chain 11. Such inclination of the rotors provides means whereby said rotors may be spaced apart at the entrance end of the apparatus a sufficient distance to accommodate and effectively remove the feathers from the body portion of the fowl, while the remote ends of said rotors may be spaced together sufficiently close to insure proper striking and rubbing engagement by the fingers of the neck portion of the fowl.

One of the features of the present invention is to provide means to insure contact by the fingers 38 of all portions of the fowl as it advances through the apparatus. Such complete contact may be accomplished only by providing means whereby the fowl is rotated while being advanced through the machine so as to present all sides to said fingers. Accordingly, the apparatus includes a pair of spaced apart guide rods 49 each supported at an end upon one of a pair of brackets 51 mounted at 52 upon one of a pair of hoods 53 provided one on each frame 16 to substantially enclose the rotors.

The guide rods 49 extend forwardly from the brackets 51 in a plane corresponding to the plane travelled by the carriers 13 and their lateral spacing is such that said carriers 13 normally pass therebetween in a plane substantially parallel to the plane of their direction of advance. However, each of the guide rods 49 is provided with means for engaging the carriers during their advance therebetween so as to momentarily retard their advance sufficiently to cause said carriers to turn about the axes of their supporting chains 12. Such means is best illustrated in Fig. 2 and may consist of a U-shaped horizontally disposed offset 54; the offset 54 in one of the rods 49 being spaced forwardly of the offset 54 in the other of said rods. Accordingly, operation of the conveyer chain 11 advances a carrier 13 between the guide rods 49 until such time as said carrier 13 comes substantially abreast the face of the first offset recess 54. As the carrier continues to advance, its leading edge drifts into the recess and after assuming a plane substantially at right angles to the plane of its direction of movement, said carrier is drawn out of the recess by continued movement of its carrier chain 11 whereupon it again advances but in a reversed end to end position between the guide rods until it comes abreast of and drifts into the other offset recess 54. At this time, it is again reversed end to end, in the same manner as has been described in connection with its engagement with the first recess 54. It should be evident that the successive engagement of the carriers 13 with the offset recesses 54 and the turning of said carriers resulting from said engagement is effective to rotate the fowl 14 about an axis substantially at right angles to the plane of rotation of the rotors 25. Consequently, said fowl is effectively engaged throughout its entire feathered surface by the fingers 38 on said rotors.

Additional effectiveness is imparted to the present machine and the engagement of the carriers 13 with the offset recesses 54 is insured by providing means whereby the guide rods 49 may be vibrated continually during machine operation. Accordingly, the guide rods 49, which are mounted at one end to the brackets 51, have their other free ends suitably shaped to extend downwardly, as at 55, and are pivotally secured at 56, to brackets 57 preferably mounted upon the transverse connecting angles 37 on frames 16, as best shown in Fig. 3. A link 58 is pivotally connected at its ends, as at 59 and 61 to said guide rod portions 55. A second link 62 is pivoted at one end at 61 and its other end is connected at 63 to an eccentric 64 carried on the shaft of a motor 65, suitably mounted upon one of the frames 16. Accordingly, upon operation of motor 65, the guide rods 49 are vibrated rapidly in a horizontal plane with sufficient intensity to impart transverse oscillation or shaking to the carriers 13 passing therebetween.

It should be apparent at this time that applicant has provided a very efficient and highly practical wholly automatic apparatus for plucking feathers from fowls, irrespective of the kind or size of the fowl passed through the machine because of the universal adjustment of which the machine is capable, and further, that the feathers of such fowl are removed at a far greater speed, and consequently at less cost, than it has heretofore been thought possible, primarily because of the angular disposition and adjustment of the rotors and the specific construction of the fingers which enables said fingers to flex sufficiently to insure contact thereby over a greater area than has heretofore been possible with known types of defeathering devices.

Applicant has further provided, by the operation and use of the present apparatus, a novel method whereby feathers may be quickly removed from fowls and wherein such removal is accomplished through rotation and vibration of the fowl during the defeathering operation.

Although a detailed description and method of use of the apparatus herein disclosed has been embodied herein, it should be understood that the apparatus is capable of a wide variety of modifications in structural details and that the invention is to be limited only by the scope of the appended claims.

I claim:

1. An apparatus for plucking feathers from a fowl comprising, a pair of spaced rotors rotatable in opposite directions, conveyer means operatively associated to advance a fowl between said rotors in the general direction of their longitudinal axis, radially disposed flexible fingers on said rotors adapted to strike and rub against opposite sides of the fowl during its advance between said rotors, and stationary means associated with the conveyor means to rotate said fowl during its advance between said rotors.

2. An apparatus for plucking feathers from a fowl comprising, a pair of spaced rotors rotatable in opposite directions, conveyor means operatively associated to advance a fowl between said rotors in the general direction of their longitudinal axis, radially disposed flexible fingers on said rotors adapted to strike and rub against opposite sides of the fowl during its advance between said rotors, and guide means operatively associated with the conveyor means to oscillate said fowl in a direction at right angles to its direction of advance between said rotors.

3. An apparatus for plucking feathers from a fowl comprising, a pair of spaced rotors rotatable in opposite directions, conveyor means operatively associated to advance a fowl between said rotors in the general direction of their longitudinal axis, radially disposed flexible fingers on said rotors adapted to strike and rub against opposite sides of the fowl during its advance between said rotors, stationary guide means operatively associated with the conveyor means to rotate said fowl during its advance between said rotors, and stationary means associated with said rotating means to oscillate the fowl rotating means to impart oscillatory motion to said fowl in a direction at right angles to its direction of advance between said rotors.

4. An apparatus for plucking feathers from a fowl comprising, a pair of rotors, a conveyer located above said rotors movable in the direction of the longitudinal axes of said rotors; carriers on said conveyer each adapted to support a fowl suspended for movement between said rotors; fingers on said rotors adapted to strike and to rub against opposite sides of the fowl during its advance between said rotors, and a guide engageable by said carriers effective to cause said carriers to rotate on vertical axes while advancing the fowl between said rotors.

5. An apparatus for plucking feathers from a fowl comprising, a pair of rotors, a conveyer located above said rotors movable in the direction of the longitudinal axes of said rotors; carriers on said conveyer each adapted to support a fowl suspended for movement between said rotors; fingers on said rotors adapted to strike and to rub against opposite sides of the fowl during its advance between said rotors, a guide engageable by said carriers effective to rotate the carriers and turn the fowl during its advance between said rotors, and means operable to oscillate said guide in a direction at right angles to the direction of movement of the carrier.

6. In an apparatus for plucking feathers from fowls, a pair of coextensive rotors normally spaced apart, means including a conveyor having fowl-supporting carriers to advance a fowl along the space between said rotors while the fowl is acted upon by said rotors, a guideway along which the carriers advance while advancing a fowl between the rotors, and means on said guideway engageable by the carriers to rotate the carriers.

7. In an apparatus for plucking feathers from fowls, a pair of coextensive rotors normally spaced apart, means including a conveyor having fowl-supporting carriers to advance a fowl along the space between said rotors while the fowl is acted upon by said rotors, a guideway along which the carriers advance while advancing a fowl between the rotors, said guideway having notched recesses engageable by the carriers to impart rotation thereto.

8. In an apparatus for plucking feathers from fowls, a pair of coextensive rotors normally spaced apart, means including a conveyor having fowl-supporting carriers to advance a fowl along the space between said rotors while the fowl is acted upon by said rotors, a guideway along which the carriers advance while advancing a fowl between the rotors, and means to move said guideway transversely of the direction of carrier movement to vibrate the carriers as they advance therealong.

9. In an apparatus for plucking feathers from fowls, a pair of coextensive rotors normally spaced apart, means including a conveyor having fowl-supporting carriers to advance a fowl along the space between said rotors while the fowl is acted upon by said rotors, spaced-apart guides, one on each side of the carriers as they advance the fowl between the rotors, and means in said guides engageable by the carriers to rotate them as they advance therebetween.

10. In an apparatus for plucking feathers from fowls, a pair of coextensive rotors normally spaced apart, means including a conveyor having fowl-supporting carriers to advance a fowl along the space between said rotors while the fowl is acted upon by said rotors, spaced-apart guides, one on each side of the carriers as they advance the fowl between the rotors, said guides being pivotally mounted on the apparatus, and means to move said guides transversely of the direction of carrier movement to vibrate the carriers as they advance therebetween.

KENT TOMLINSON.

REFERENCES CITED

The following references are of record in the file of this patent:

UNITED STATES PATENTS

| Number | Name | Date |
|---|---|---|
| 693,127 | Gardner et al. | Feb. 11, 1902 |
| 920,566 | Griggs | May 4, 1909 |
| 1,217,393 | Berg | Feb. 27, 1917 |
| 1,372,595 | Bouda | Mar. 22, 1921 |
| 1,755,665 | Richards | Apr. 22, 1930 |
| 1,889,228 | Swanson | Nov. 29, 1932 |
| 2,235,619 | McMahan et al. | Mar. 18, 1941 |
| 2,286,650 | Sandlin | June 16, 1942 |
| 2,302,525 | Campbell | Nov. 17, 1942 |
| 2,358,693 | Du Puy | Sept. 19, 1944 |
| 2,389,404 | Barker | Nov. 20, 1945 |
| 2,432,523 | Johnson | Dec. 16, 1947 |